United States Patent [19]

Miessen et al.

[11] 4,014,958

[45] Mar. 29, 1977

[54] DRY-SPUN MODACRYLIC FILAMENTS WITH IMPROVED COLORISTIC PROPERTIES

[75] Inventors: Ralf Miessen, Dormagen; Günter Blankenstein, Stommeln; Siegfried Korte, Leverkusen; Carlhans Süling, Odenthal-Hahnenberg, all of Germany

[73] Assignee: Bayer Aktiengesellschaft, Leverkusen, Germany

[22] Filed: Nov. 11, 1975

[21] Appl. No.: 630,775

[30] Foreign Application Priority Data

Nov. 15, 1974 Germany .......................... 2454322
May 30, 1975 Germany .......................... 2524125

[52] U.S. Cl. .............................. 260/898; 264/182; 264/290 R; 264/210 F
[51] Int. Cl.² ....................................... C08L 33/20
[58] Field of Search ................................... 260/898

[56] References Cited

UNITED STATES PATENTS

| 2,861,101 | 11/1958 | Tousignant et al. | 260/513 |
| 2,949,437 | 8/1960 | Hobson | 260/898 |
| 3,139,621 | 6/1964 | Stewart | 260/41 |
| 3,287,304 | 11/1966 | Fujisaki et al. | 260/29.6 |
| 3,507,823 | 4/1970 | Trapasso et al. | 260/32.6 |

FOREIGN PATENTS OR APPLICATIONS

| 1,121,247 | 7/1968 | United Kingdom | 260/898 |

*Primary Examiner*—Carman J. Seccuro
*Attorney, Agent, or Firm*—Plumley and Tyner

[57] ABSTRACT

The invention relates to dry-spun modacrylic filaments with improved coloristic properties based on a polymer mixture, which comprises at least one acrylonitrile-vinyl chloride copolymer and a chlorine-containing copolymer containing sulphonic acid ester groups or sulphuric acid ester groups.

5 Claims, No Drawings

DRY-SPUN MODACRYLIC FILAMENTS WITH IMPROVED COLORISTIC PROPERTIES

It is known that the coloristic properties of synthetic fibres can be improved by the incorporation of dye-receptive groups. To this end, the starting material from which the fibres are produced is modified by using special starter systems or by incorporating comonomers having dye-receptive groups, or alternatively polymer mixtures, in which one component contains the dye-receptive groups in increased concentrations, are used as the starting material for the fibres. According to Japanese Pat. No. 35/22478/1960, $-SO_3^-$ or $-O-SO_3^-$ are formed as terminal groups during copolymerization, for example by using a redox system based on ammonium persulphate, dihydroxy maleic acid and iron(II)sulphate.

Terminal groups of this kind provide the starting material for fibres having a special affinity for basic dyes. One disadvantage of this process is that only relatively small quantities of dye-receptive groups can be incorporated in the starting material, in addition to which the fibres cannot be dyed deep shades with basic dyes. In addition, minor fluctuations in the conditions under which the starting material for the fibres is produced, i.e. for example during polymerization, result in significant changes in the molecular weight distribution and, hence, in marked changes in the dyeing properties of the fibres due to the change in the number of terminal groups.

In addition, it is known from Canadian Pat. No. 704,778 that starting polymers for modacrylic fibres and modacrylic filaments with improved coloristic properties can be produced by the polyerization in an aqueous emulsion of acrylonitrile, vinyl chloride and compounds such as N-acryloyl dimethyl taurine. One disadvantage of the process described in Canadian Pat. No. 704,778 is that copolymerization can only be carried out up to a 50% conversion of the comonomers used. In contrast to the readily volatile and substantially water-insoluble comonomers, vinyl chloride or acrylonitrile, the readily water-soluble comonomers containing involatile sulphonic acid groups can only be recovered from the reaction medium on the completion of polymerization by a highly elaborate process. Under the conditions described in Canadian Pat. No. 704,778, the incorporation rate of the comonomers, such as acryloyl dimethyl taurine and methacryloyl taurine, is governed by the conversion level, due in particular to the low conversion level during copolymerization, and a fibre starting material with constant coloristic properties can only be obtained with considerable outlay by specifically displacing and controlling the reaction.

In addition, it is known from U.S. Pat. No. 3,113,122 that the affinity for dyes of acrylic or modacrylic filaments can be improved by the addition of copolymers. In this process, the actual fibre starting material, which contains at least 35% of copolymerized acrylonitrile, is mixed with up to 20% of a copolymer of 60 to 95% of 2-cyanoethyl-(meth)-acrylate and 5 to 40% of a $C_1$ to $C_{12}$-alkyl acrylate or $C_1$ to $C_{12}$-alkyl methacrylate. One disadvantage of the fibre material obtained by this process is that, in general, it is only the rate of absorption of dyes which is increased by an additive which, under the dyeing conditions, acts as a plasticiser and, hence, loosens the structure of the fibres. It is not possible in this way to increase dye saturation. In other words, although the maximum depth of color can be reached relatively quickly during dyeing, the additive is unable to increase the maximum dye absorption because, as is generally known, the maximum quantity of basic or acid dyes which can be taken up is determined by the total number of acceptor groups present. In the case of basic dyes, therefore, it is the concentration of acid groups in the fibre starting material which determines the maximum dye absorption. Furthermore, the addition of plasticising additives to the fibre starting material, especially in the case of modacrylic filaments and fibres, adversely affect the dimensional stability of the resulting filaments and fibres to a considerable extent, especially under the conditions of the dyeing process. However, high dimensional stability under dyeing conditions is absolutely essential for numerous applications.

It has now been found that modacrylic filaments with improved coloristic properties and adequate dimensional stability can be obtained from acrylonitrile/vinyl chloride copolymers by spinning polymer mixtures of at least one acrylonitrile/vinyl chloride copolymer and a chlorine-containing copolymer which contains sulphonic acid groups or sulphuric acid ester groups.

Accordingly, the present invention relates to a dry-spun modacrylic filament with improved coloristic properties and adequate dimensional stability under dyeing conditions based on polymer mixture, which comprises at least one acrylonitrile-vinyl chloride copolymer and a copolymer containing chlorine and sulphonic acid groups or sulphuric acid ester groups.

The invention also relates further to a process for the production of a dry-spun modacrylic filament with improved coloristic properties and adequate dimensional stability under dyeing conditions by spinning a polymer mixture, wherein said polymer mixture comprises at least one acrylonitrile-vinyl-chloride copolymer and a copolymer containing chlorine and sulphonic acid groups or sulphuric acid ester groups.

At least one component of these mixtures is a copolymer of acrylonitrile and vinyl chloride generally containing from 30 to 70% by weight and preferably from 40 to 65% by weight of vinyl chloride. Products containing 55 to 65% by weight of vinyl chloride are particularly suitable. In addition to the acrylonitrile-vinyl chloride copolymer, the polymer mixture, from which the modacrylic filaments according to the invention are obtained, contains as a component a linear chlorine-containing copolymer which contains sulphonic acid groups or sulphuric acid semiester groups which are either attached through main valences to the polymer chain by the incorporation of an appropriate comonomer or are introduced by a polymer-analogue reaction into a suitable polymer.

Copolymers which contain chlorine and sulphonic acid groups or sulphuric acid ester groups and with which a useful technical effect is obtained in accordance with the invention, are obtained for example by solution polymerization at temperature in the range of from 35° to 85° C in solvents such as dimethyl formamide, dimethyl acetamide or dimethyl sulphoxide. The copolymerization reaction is carried out by polymerizing the comonomers used in a concentration of from 20 to 40% in the presence of radical formers, such as azodiisobutyronitrile, or peroxides, such as benzoyl peroxide. Starter systems which have proved to be particularly effective for this solution polymerization reaction are redox systems based on a persulphate and oxalic acid or on a persulphate and tetravalent compounds of sulphur. Other suitable starter systems are redox systems containing hydroperoxides, such as tert-butyl hydroperoxide or $H_2O_2$, as the oxidizing component, and sulphinic acids or amines as the reducing component.

The composition of the polymeric additive containing sulphonic acid groups or sulphuric acid groups is governed by various criteria.

Firstly, the fibre starting material, i.e. the acrylonitrile-vinyl chloride copolymer, must be compatible with the additive if homogeneous spinning solutions are to be obtained. Secondly, a minimum chlorine content is preferred in the polymeric additive in order to minimize the inflammability of the modacrylic filaments. It has been found that, in cases where vinyl chloride or vinylidene chloride is used, favourable results are obtained with contents of from 10 to 40% by weight of the chlorine-containing comonomer. However, the dye-receptive copolymer preferably has copolymerized vinyl chloride or vinylidene chloride contents of from 15 to 35% by weight.

A favorable technical effect in regard to compatibility is generally obtained when the sulphur content of these polymers amounts to at least 0.6% by weight. However, it is preferred to use polymers with a sulphur content of more than 1.0%. Particularly useful results are obtained in cases where, on the one hand, the mixture component has as high a sulphur content as possible and, on the other hand, is compatible with the other component(s) of the polymer mixture, so that useful spinning solutions can be obtained from the mixture. Results which satisfy commercial requirements are obtained in cases where the copolymers contain from 1.5 to 5% by weight of sulphur. In most cases, polymers or copolymers with higher sulphur contents are incompatible with vinyl chloride/acrylonitrile copolymers and are only suitable for use as polymeric dye-receptive additives in special cases.

In order to guarantee optimum compatibility of the polymeric dye-receptive additive with the fibre starting material, it is advantageous to use copolymers containing, as additional components, compounds such as acrylonitrile, acrylic acid esters, for example methyl acrylate and ethyl acrylate, acrylamides, for example acrylamide, N-methyl acrylamide, N-tert.-butyl acrylamide and N,N-dimethyl acrylamide, methacrylic acid esters such as, for example, methacrylic acid methyl and ethyl ester, methacrylic acid amides, for example methacrylamide, N-methyl methacrylamide and N,N-dimethyl methacrylamide, vinyl esters, for example vinylacetate, and styrene. The polymeric dye-receptive additives are preferably used in the form of ternary copolymers of vinyl chloride and/or vinylidene chloride, acrylonitrile and a comonomer containing sulphonic acid groups or sulphuric acid semiester groups.

Suitable comonomers containing sulphonic acid or sulphuric acid ester groups are, for example, allyl sulphonic acid, methallyl sulphonic acid, styrene sulphonic acid, N-acryloyl taurine, N-methacryloyl taurine, N,acryloyl dimethyl taurine or N-methacryloyl dimethyl taurine, and also vinyl sulphonic acid and the sulphuric acid semiesters of allyl alochol, methallyl alcohol and of other ethylenically unsaturated compounds containing hydroxyl groups, such as the sulphuric acid semiester of ethylene glycol acrylate or ethylene glycol methacrylate.

The molecular weights of the polymeric dye-receptive additives may vary within wide limits and are not critical to the effect according to the invention. However, since the mutual compatibility of polymers in mixtures is in some cases governed by the molecular weight of the components of the mixture, it is necessary to co-ordinate the components with one another not only in regard to their sulphur content, but also in regard to their molecular weight. In general, suitable polymers are those with a molecular weight in the range of from 500 to 500,000. It is preferred to use copolymers with average molecular weights in the range of from 2000 to 200,000. In many cases, it has been found that copolymers with relatively high sulphur contents, for example 2% by weight, which are suitable for use as polymeric dye-receptive additives, are compatible with acrylonitrile-vinyl chloride copolymers when the polymeric dye-receptive additives have molecular weights in the range of from 1000 to 50,000. In many cases, the compatibility of the polymeric dye-receptive additive improves with decreasing molecular weight.

The improvement according to the invention in the coloristic properties of the modacrylic filaments is obtained by adding the dye-receptive additive to the fibre starting material in such quantities that the polymer mixture has a total sulphur content of from 0.1 to 1% by weight. In order to obtain even dye finished with basic dyes, it is advantageous to adjust a sulphur content of from 0.2 to 0.8% by weight. Sulphur contents of from 0.25 to 0.5% by weight are particularly advantageous in regard to the fastness to light of the dye finishes.

The coloristic properties of modacrylic filaments and modacrylic fibres are generally defined by the fibre saturation value $S_f$ and by the rate of dye-absorption V as characteristics (as described in "Textilindustrie" 71, 9/1969, pages 603–608) where basic dyes are used for dyeing. High fibre saturation value represent a high concentration of dye-acceptor groups in the fibre starting material. High absorption rates means that the given acceptor groups are quickly saturated with dye molecules.

The modacrylic filaments according to the invention are evenly dyed deep colors with the usual basic dyes. Such shades as black or marine blue are obtained in favorable dyeing times without any need to use ecologically critical dyeing auxiliaries. It was surprising that, in the modacrylic filaments according to the invention, the fastness to light of the dye finishes should be considerably improved by comparison with modacrylic filaments of non-modified fibre material. By virtue of the process according to the invention, i.e. by combining a fibre starting material with a polymeric additive containing dye-receptive groups, i.e., a "polymeric dye-receptive additive", it is possible to obtain not only an improvement in the applicability of basic dyes, but also an improvement in the fastness to light of the dye finishes.

The filaments with the improved coloristic properties are obtained by dry-spinning solutions of the polymer mixtures. Whereas modacrylic filaments are normally obtained by spinning solutions of the starting materials in acetone, in cyclohexanone or in acetonitrile, the process according to the invention is more suitable for the production of modacrylic fibres and modacrylic filaments from solutions of the polymer mixtures in solvents of the type suitable for the production of acrylic filaments. Solvents of this kind are dimethyl formamide, dimethyl acetamide and dimethyl sulphoxide. Particularly favorable results are obtained by dissolving the polymer mixtures in dimethyl formamide or in dimethyl acetamide and spinning the resulting solutions by a dry-spinning process. The spinning solutions may be prepared either by dissolving the individual components and subsequently mixing the resulting solutions, or by dissolving the premixed components at room temperature and/or at elevated temperatures. Dissolution may be carried out continuously or in several stages in stirrer-equipped vessels or in dissolving screws. For example, the polymer and solvent may first be combined with one another in a mixing screw, and the actual spinning solution subsequently produced at elevated temperature either in a dissolving screw or in a strirrer-equipped vessel. In some cases, the spinning solutions have to be treated for a prolonged period at elevated temperatures. It is advantageous not to exceed temperatures above 100° C, although temperatures of 80° C are preferably not exceeded. Particularly favorable results are obtained where temperatures in the range of from 15° to 60° C are maintained during dissolution.

The concentration of the polymer mixture in the spinning solutions is generally between 25 and 40% by weight. Depending on the average molecular weight of the components, favorable spinning results are obtained either with the fairly high or with the fairly low concentrations of the spinning solutions, although it is preferred to use spinning solutions with concentrations above 30% by weight. In most cases, it is best to spin 35 to 38% solutions. The spinning solutions should have viscosities of from 700 to 6000 poises, preferably from 2500 to 4000 poises, as measured at 20° C. The spinning solution is transported from the particular dissolution units used to the spinnerets through metering units, for example metering pumps, and heating units. In this connection, it can be advantageous to ensure, optionally by secondary heating, that the temperature of the spinning solution is regulated to prevent the spinning solutions from gelling. Favorable results are obtained by keeping the spinning solutions at temperatures in the range from 20° to 50° C, depending upon their concentration and viscosity. The spinning solution does not undergo degradation or gelation, even in the event of a prolonged residence time. This surprising effect is a particular advantage of the solvents preferably used in accordance with the invention, dimethyl acetamide and dimethyl formamide, over the solvents normally used for dissolving halogen-containing copolymers, such as cyclohexanone, acetonitrile and acetone. Gear pumps have proved to be particularly effective metering units. The spinning solution is pumped by way of heating units working in the range of from 20° to 140° C through spinnerets, for example in the form of cap dies or ring dies, arranged in heated spinning ducts. The heated spinning ducts are kept at temperatures in the range of from 130° to 190° C, preferably in the range of from 150° to 170° C. Most of the solvent is removed from the filaments with a hot gas stream, preferably air, with a temperature of from 150° to 220° C. Particularly advantageous spinning results are obtained where the temperature of the air used is selected in such a way that temperatures of from 170° to 20° C prevail in the immediate vicinity of the spinneret. Tows with a spun denier of 400 to 5000 dtex are obtained according to the number of bores in the spinneret, the diameter of the bores, which should be between 150 and 300 $\mu$, and the quantity of spinning solution delivered per unit of time. The resulting spun material may still contain solvent and is stretched at elevated temperature by methods known per se and subsequently washed, dried, optionally crimped and cut. Dyeing with cationic dyes is carried out by known methods at elevated temperature in a weakly acid medium. The quantities of dye taken up may readily be quantitatively determined by colorimetric measurement.

The following examples are to further illustrate the invention without limiting it.

EXAMPLES

A. Example of the production of a polymeric dye-receptive additive of acrylonitrile, vinylidene chloride and N-acryloyl dimethyl taurine.

The following solutions and mixtures are used:

I 4325 g of dimethyl formamide
175 g of deionized water

II 1000 g of dimethyl formamide
375 g of N-acryloyl dimethyl taurine (ADT)
132.5 g of 2-methyl amino ethanol

III 1250 g of acrylonitrile
875 g of vinylidene chloride

IV 300 g of dimethyl formamide
6 g of ammonium peroxy disulphate

V 300 g of dimethyl formamide
7 g of oxalic acid

The DMF/water mixture (I) is initially introduced into a 10 liter/glass reaction vessel, equipped with a reflux condenser cooled with iced water, a stirrer and a gas inlet pipe, followed by rinsing with nitrogen at 50° C. The ADT-ammonium salt solution (II) obtained by neutralisation at 0° C and the monomer mixture (III) are then combined with the DMF/water mixture (I). After the reaction temperature of 50° C has been adjusted, polymerization is initiated by the addition of the initator solutions (IV) and (V).

After 15 hours, a solids content of 24.0%, by weight is reached in the solution, corresponding to a conversion of 75%. Following dilution with water, a polymer of the following composition is recovered from the polymer solution with a conversion of 75% by the addition of electrolyte:

47.0% weight of acrylonitrile
32.0% by weight of vinylidene chloride
21.0% by weight of N-acryloyl dimethyl taurine (in the form of the ammonium salt of 2-methyl amino ethanol) (ADT-salt)

K-value: 72
Yield: 1970 g

EXAMPLE B (Comparison Example)

A copolymer of acrylonitrile and vinyl chloride, which contains the comonomers in a ratio of 42 : 58 and which has an intrinsic viscosity in DMF of 0.99 at 25° C, is made into a paste with dimethyl formamide at room temperature, and dissolved over a period of 6.5 hours at 40° C in a stirrer-equipped vessel.

In order to remove gas bubbles, the vessel is evacuated for 30 minutes, resulting in the formation of a spinning solution with a viscosity of 2000 poises at 40° C. This solution is delivered by a gear pump acting as a metering unit through a spinneret in the form of an annular die which is arranged in a vertical spinning duct and comprises 120 bores with a diameter of 0.15 mm. The solution is pumped at a rate of 38.4 cc/minute, and the filaments are taken off at a rate of 100 meters per minute. The spinning process is carried out at a duct temperature of 145° to 150° C, and at an air temperature of 180° C, the draft applied in the spinning duct amounting to 1:5.5. The resulting filaments are stretched to five times their original length in boiling water, after which the material is treated at 140° C, resulting in 25% shrinkage. Modacrylic filaments characterised by the following values are obtained:

| tensile strength | 2.02 p/dtex |
| elongation at break | 40.3% |

A fibre saturation value $S_F$ of 1.2 and an absorption rate V of 0.76 are obtained during dyeing with basis dyes.

EXAMPLE 1

The procedure is as in Example B, except that the vinyl chloride-acrylonitrile copolymer used is replaced, in accordance with the invention, by a mixture of that copolymer and the acrylonitrile-vinylidene chloride-acryloyl dimethyl taurine terpolymer according to Example A in a mixing ratio of 92% by weight of the copolymer and 8% by weight of the terpolymer. Dry spinning was carried out under the following conditions:

| spinning duct temperature | 151° C |
| air temperature | 182° C |
| spinneret temperature | 100° C |
| delivery rate | 39.4 cc of solution per minute |
| take off rate | 100 m/minute |
| in-duct draft | 1 : 5.2 |

The further aftertreatment was carried out in the same way as in Example B. The filaments obtained have the following values:

| tensile strength | 1.94 p/dtex |
| elongation at break | 38 % |

A fibre saturation value number $S_F$ of 3.3 and an absorption rate V of 2.07 are obtained during dyeing with basic dyes.

The values characteristic of chloristic behavior are significantly improved in relation to the Comparison Example.

EXAMPLE C (Comparison Example)

A copolymer P of acrylonitrile and vinyl chloride in a ratio by weight of 42.4:57.6 is made into a paste with DMF at 40° C in a dissolving screw, and subsequently dissolved in a vessel over a period of about 2 hours, so that the solids content amounts to 38%, by weight. The solution heated to 70° C is extruded through a spinneret into a duct heated to 160° C and most of the solvent is removed by air heated to 190° C. The filaments formed are run off from the spinning duct at a rate of 200 meters per minute. After stretching by 400% in boiling water, the filaments are dried under tension at 80° C.

A fibre saturation value $S_F$ of 1.3 and an absorption rate of 0.76 are obtained during dyeing with basic dyes.

EXAMPLE 2

The copolymer P of Comparison Example C is mixed with a polymeric dye-receptive component X of 50% by weight of N-tert-butyl acrylic acid amide, 33% by weight of vinylidene chloride and 17% by weight of ADT salt (K-value; 50) in such a way that the ratio by weight P : X amounts of 93 : 7. When filaments are produced from this polymer mixture P + X in accordance with the invention by the process described in Example C, the following characteristic values are obtained under the same dyeing conditions as in Example C:

$S_V = 2.7$ $V = 1.6$

EXAMPLE 3

The copolymer P described in Example C is mixed with 7% by weight, based on the total weight of the polymer, of a ternary dye-receptive copolymer Y (K-value:57) which has the following composition:

48% by weight of methyl acrylate
34% by weight of vinylidene chloride
18% by weight of ADT salt.

When filaments are produced from the polymer mixture A + Y in accordance with the invention by the method described in Example C, the following values are obtained after dyeing under the same conditions as in Example C:

$S_F \geqq 5.0$ $V = 2.0$

EXAMPLE 4

Comparison of the light fastness values with and without a dye-receptive additive.

A copolymer of 60% by weight of vinyl chloride and 40% by weight of acrylonitrile was mixed with 10% by weight, based on the polymer mixture, of an additive consisting of 48% by weight of acrylonitrile, 31.5% by weight of vinylidene chloride and 20.5% by weight of ADT salt and the resulting mixture was spun under the conditions of Example B to form filaments which were dyed on the one hand with a yellow dye corresponding to the formula:

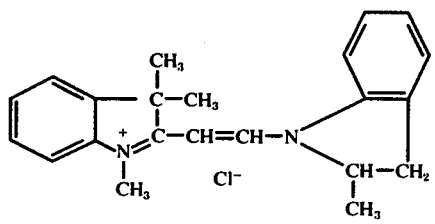 (I)

and on the other hand with a red dye corresponding to the formula:

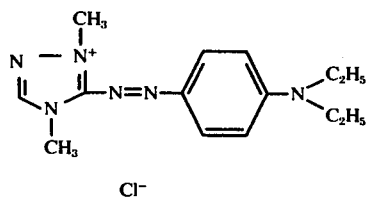 (II)

In a comparison test, filaments were spun in the same way from the above-mentioned copolymer, but without the additive, and dyed.

The light fastness values are shown in the following Table:

| Dye | Fastness to light | |
|---|---|---|
| | According to the invention | Comparison |
| I | >6 | 4 – 5 |
| II | >6 | 5 |

The light fastness test was carried out in artificial daylight in accordance with DIN 54004 which stipulates the light fastness requirements of dye finishes and prints.

We claim:
1. A dry-spun modacrylic filament with improved coloristic properties and adequate dimensional stability under dyeing conditions based on a polymer mixture, which comprises at least one acrylonitrile-vinyl chloride copolymer and a copolymer containing chlorine and sulphonic acid groups or sulphuric acid ester groups.
2. The filament of claim 1, wherein said acrylonitrile-vinyl chloride copolymer consists of from 30 to 70% of vinyl chloride.
3. The filament of claim 1, wherein said copolymer containing chlorine and sulphonic acid groups or sulphuric acid ester groups has a sulphur content of from 0.6 to 5% by weight.
4. The filament of claim 1, wherein said copolymer containing chlorine ans sulphonic acid groups or sulphuric acid ester groups has a chlorine content of from 10 to 30 % by weight.
5. The filament of claim 1, having a total sulphur content of from 0.1 to 1% by weight.

* * * * *